United States Patent
Arakawa et al.

[11] 3,884,970
[45] May 20, 1975

[54] RESINOUS CARBOXYLIC ACID DERIVATIVES

[75] Inventors: Morimasa Arakawa, Ashiya; Akisato Katanosaka, Toyonaka; Manabu Hanamoto, Nishinomiya; Jyunichiro Ohtsubo, Izumi, all of Japan

[73] Assignee: Nard Institute, Ltd., Japan

[22] Filed: Sept. 19, 1973

[21] Appl. No.: 398,780

[30] Foreign Application Priority Data
Sept. 21, 1972  Japan.................. 47-95517
Dec. 1, 1972    Japan.................. 47-120825
Dec. 29, 1972   Japan.................. 47-453
May 10, 1973    Japan.................. 48-52274

[52] U.S. Cl. ...... 260/514 G; 252/356; 260/247.2 R; 260/464; 260/468 G; 260/501.1; 260/501.15; 260/501.2; 260/648 C; 260/665 G; 260/666 A
[51] Int. Cl.... C07c 61/12; C07c 61/28; C07c 69/74
[58] Field of Search................ 260/468 G, 514 G

[56] References Cited
UNITED STATES PATENTS
3,305,579  2/1967  Stadler et al. ............... 260/468
3,492,330  1/1970  Trecker et al. ............... 260/453

OTHER PUBLICATIONS
Kaufman et al., Farbenchemiker, 61, 1, (1959), C.A., 54, 5120, e.

*Primary Examiner*—Robert Gersil
*Attorney, Agent, or Firm*—Wenderoth, Lind & Ponack

[57] ABSTRACT
A resinous condensed cyclic alkane or alkene carboxylic

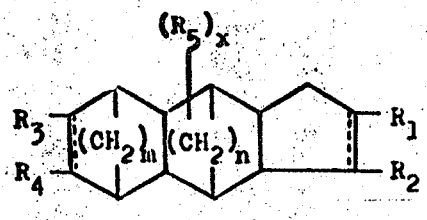

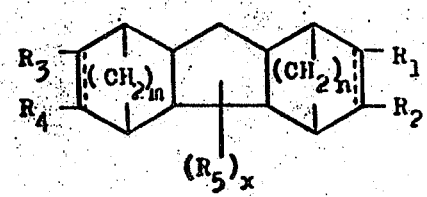

wherein $R_1$, $R_2$, $R_3$ and $R_4$ are each carboxyl, alkoxycarbonyl or hydrogen but one or two of $R_1$ to $R_4$ are always carboxyl or alkoxycarbonyl of which the alkoxy moiety has 1 to 6 carbon atoms and, when more than one carboxyl or alkoxycarbonyl is present, they can not be present at the adjacent positions; $R_5$ is alkyl having 1 to 6 carbon atoms which may be present at any position from the 1- to 9a-positions; $m$ and $n$ are each an integer of 0 or 1 but at least one of them is 1; $x$ is an integer of 0 to 3; and not more than one double bond may be present between the positions indicated by a dotted line and, when present, carboxyl or alkoxycarbonyl can not exist at such positions, which is useful for the production of an emulsifying agent effective in the emulsion polymerization for the production of synthetic rubber.

7 Claims, No Drawings

RESINOUS CARBOXYLIC ACID DERIVATIVES

The present invention relates to novel resinous carboxylic acid derivatives and their production and use. More particularly, it relates to rosin-like carboxylic acid derivatives and their production and use.

As already known, rosin comprises resin acids including abietic acid of the formula:

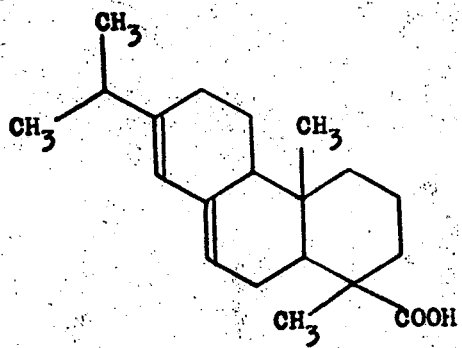

and structural isomers thereof. Because the alkali salt of the resin acid exhibits an excellent surface activity of the anion type due to the alicyclic structure including a carboxyl group, it can improve the quality of industrial materials such as other resins, rubbers and fibers when incorporated therein. For instance, when an alkali salt of rosin is used as an emulsifying agent for the emulsion polymerization to produce a synthetic rubber such as styrene-butadiene rubber (SBR) or acrylonitrile-butadiene rubber (NBR), it enhances the amenability and the tackiness of the resulting product. The alkali salt is therefore used universally for industrial purposes. Before application to such uses, the rosin is disproportioned and stabilized so that it will not inhibit radical polymerization.

Rosin is soluble in various solvents and has good compatibility with various high molecular weight substances. Rosin is lowest in molecular weight of all resins. Whereas rosin has a molecular weight of about 300, resins having a similar softening point to that of rosin (70° to 80°C) have generally a molecular weight of at least 500, mostly a molecular weight of 1000 to 3000. For this reason, rosin displays better compatibility with a wider variety of high molecular weight substances than other resins. Because rosin is a resin, it gives a peculiar effect as distinct from the effect achieved by oily substances. For instance, when incorporated in resin or rubber, oily substances chiefly produce a plasticizing effect while resinous substances mainly exhibit a tackifying effect. Accordingly, rosin or its ester with a polyhydric alcohol like glycerin is used with rubber or plastics to produce a pressure sensitive adhesive, a hotmelt adhesive and the like. Further, rosin can be modified into a resin having a high softening point of 120° to 180°C by reacting it with maleic acid, fumaric acid or phenolic resin, followed by esterification with a polyhydric alcohol or by converting into a polyvalent metal salt such as calcium or zinc salt. The resin thus obtained is used widely in coating compositions, printing inks and adhesives.

While rosin is naturally contained in a pine tree and collected through suitable processes which include, for example, seeping from the chopped tree, extracting the old stump with a solvent and recovering from the skimming obtained in the preparation of sulphate pulp from a pine tree, its supply is not stable. It is therefore of great importance in the art to synthesize a rosin-like resin having properties and characteristics similar to those of rosin, and petroleum resin has been consequently utilized as a substitute for rosin. Petroleum resin can stand for a varnish which is added to a paint or a printing ink, but not satisfactorily for an emulsifying agent in the emulsion polymerization for production of synthetic rubber.

It has heretofore been proposed to prepare a useful compound by modifying the condensed alicyclic compound which is derived from cyclopentadiene (CPD) by polymerization. For instance, it is known that carboxylization of dicyclopentadiene (DCPD) affords DCPD carboxylic acid which can be utilized as a desiccating agent for paint, a fiber treating agent or an antifungal agent (U.S. Pat. No. 2,688,627). It is also known that carbonylation of the polymerized product of DCPD gives the corresponding methylol and methylal which can be utilized as wax composition (U.S. Pat. No. 2,898,316).

In U.S. Pat. No. 2,898,316, it is disclosed that tetracyclopentadiene methylol, tetracylopentadiene dimethylol, tetracyclopentadiene methylal and tetracyclopentadiene dimethylal, among the carboxylated polymers, are useful as wax. It is also disclosed that these methylal and methylol can be converted into the corresponding carboxylic acids or esters prior to their use. But, any concrete procedure therefor is never disclosed therein. Thus, a low molecular weight resinous carboxylic acid derivative utilizable as a substitute for rosin has not been prepared from the polymerized compound of CPD.

A main object of the present invention is to provide a novel rosin-like compound having properties and characteristics similar to those of rosin and being utilizable as a substitute for rosin.

Another object of this invention is to provide a process for manufacturing the rosin-like resin from materials such as thermal cracking products petroleum naptha or coal (e.g. CPD or its analogous compound).

A further object of the invention is to provide a composition containing the rosin-like resin which can be used for a wide variety of purposes as a substitute for rosin, particularly as an emulsifier in the emulsion polymerization for production of synthetic rubber.

These and other advantages and objects of the invention will be apparent from the following descriptions.

The resin of this invention has the following chemical structure:

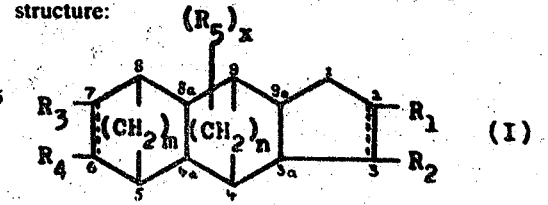

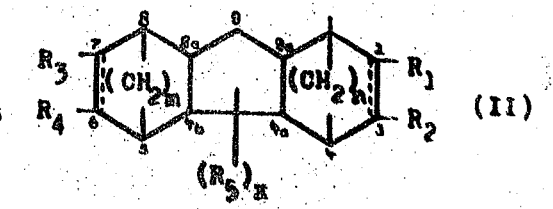

wherein $R_1$, $R_2$, $R_3$ and $R_4$ are each carboxyl, alkoxycarbonyl or hydrogen but one or two of $R_1$ to $R_4$ are always carboxyl or alkoxycarbonyl of which the alkoxy moeity has 1 to 6 carbon atoms and, when more than one carboxyl or alkoxycarbonyl is present, they can not be present at the adjacent positions; $R_5$ is alkyl having 1 to 6 carbon atoms which may be present at any position from the 1- to 9a-positions; $m$ and $n$ are each an integer of 0 or 1 but at least one of them is 1; $x$ is an integer of 0 to 3, and not more than one double bond may be present between the positions indicated by a dotted line and, when present, carboxyl or alkoxycarbonyl can not exist at such positions.

As will be apparent from the molecular structure, the resin of this invention is similar to rosin or its derivatives in chemical structure in having one or two carboxyl groups and an alicyclic group which may contain an unsaturation. Moreover, the resin, particularly having 15 to 35 carbon atoms, is rosinlike and shows very similar properties to rosin. Such resin has a molecular weight of 230 to 346, an acid value of 162 to 489 and a ring and ball softening point up to 100°C. The most preferable is the resin having 15 to 17 carbon atoms.

The resin (I) or (II) of this invention is obtained by carboxylating or alkoxycarbonylating the following condensed cyclic alkene or alkadiene:

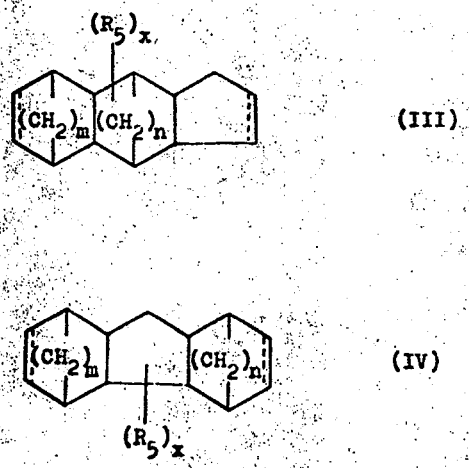

(III)

or (IV)

wherein $R_5$, $m$, $n$ and $x$ are each as defined above and one or two double bond(s) are present between the positions indicated by a dotted line with or without previous partial hydrogenation.

Examples of the starting compounds (III) and (IV) of this invention include, for example, 3a, 4, 4a, 5, 8, 8a, 9, 9a-octahydro-4,9-methano-5,8-methano-1H-benzo[b]indene (tricyclopentadiene corresponding to the general formula (III) : TCPD (III) ); 1, 4, 4a, 4b, 5, 8, 8a, 9a-octahydro-1,4-methano-5,8-methano-9H-fluorene (tricyclopentadiene corresponding to the general formula (III); dihydro TCPD (III)), 1,4,4a,4b, 5, 6, 7, 8, 8a, 9a-decahydro-1,4-methano-5,8-methano-9H-fluorene (dihydro tricyclopentadiene corresponding to the general formula (IV): dihydro TCPD (IV)), 3a, 4, 4a, 5, 8, 8a, 9, 9a-octahydro-5,8-methano-1H-benzo[b] indene, 3a, 4, 4a, 5, 6, 7, 8, 8a, 9, 9a-decahydro-5,8-methano-1H-benzo[b] indene, 1, 2, 3a, 4, 4a, 5, 8, 8a, 9, 9a, decahydro-5,8-methano-1H-benzo [b] indene, 1, 4, 4a, 4b, 5, 8, 8a, 9a-octahydro-1,4-methano-9H-fluorene, 1, 4, 4a, 4b, 5, 6, 7, 8, 8a, 9a-decahydeo-1,4-methano-9H-fluorene, 1, 2, 3, 4, 4a, 4b, 5, 8, 8a, 9a-decahydro-1,4-methano-9H-fluorene, mono-(di- or tri- ) lower alkyl substituted derivatives thereof and the like.

TCPD (III) and TCPD (IV) used as the starting compounds are known and can usually be synthesized, for example, by heating CPD or DCPD at 200°C. Thus obtained reaction product is a mixture of TCPD (III) and TCPD (IV) in a weight ratio of about 90 : 10. TCPD (III) and TCPD (IV) can be respectively subjected for carboxylation after separating from each other or without separating. Alkyl-substituted TCPD (III) or (IV) can be easily synthesized by reacting alkyl-substituted CPD of CPD with alkyl-substituted CPD such as methyl-CPD. These CPD compounds are easily available in large amounts from petrochemical industry. 3a, 4, 4a, 5, 8, 8a, 9, 9a-Octahydro-5,8-methano-1H-benzo[b]indene, 1, 4, 4a, 4b, 5, 8, 8a, 9a-octahydro-1,4-methano-9H-fluorene or its alkyl-substituted derivative is obtained by adding CPD or alkyl-substituted CPD to tetrahydroindene (THI) or alkyl-substituted THI according to the Diels-Alder reaction. 1, 2, 3a, 4, 4a, 5, 8, 8a, 9, 9a-Decahydro-5,8-methano-1H-benzo[b]indene or 1, 4, 4a, 4b, 5, 6, 7, 8, a, 9a-decahydro-1,4-methano-9H-fluorene, or its alkyl-substituted compounds is obtained by adding CPD or alkyl-substituted CPD to hexahydroindene (HHI) or alkyl-substituted HHI. THI may be prepared by reacting CPD with 1,3-butadiene, and HHI may be prepared from THI by hydrogenating.

Other mono olefinic starting compounds such as dihydro TCPD (III), dihydro TCPD (IV), 3a, 4, 4a, 5, 6, 7, 8, 8a, 9, 9a-decahydro-5,8-methano-1H-benzo[b]indene, 1, 4, 4a, 4b, 5, 6, 7, 8, 8a, 9a-decahydro-1,4-methano-9H-fluorene and their alkyl-substituted compounds are obtained by partially hydrogenating the above described diolefinic starting compounds such as TCPD (III), TCPD (IV), 3a, 4, 4a, 5, 8, 8a, 9, 9a-octahydro-5,8-methano-1H-benzo[b]indene, 1, 4, 4a, 4b, 5, 8, 8a, 9a-octahydro-1,4-methano-9H-fluorene and their alkyl-substituted compounds.

The partial hydrogenation may be effected by a per se conventional procedure such as reduction in the presence of a hydrogenation catalyst (e.g. nickel, platinum, rhodium ruthenium, palladium) or reduction with borohydride, boron trifluoride or the like.

The said partial hydrogenation proceeds on the olefinic group of the norbornene ring rather than on that of the cyclopentene or cyclohexene ring, since the reactivity of the latter is inferior to that of the former. Therefore, the partial hydrogenation is preferably stopped at the comparatively early stage of the reaction so as not to complete the hydrogenation for two olefinic groups of the starting compound (III) or (IV).

In the case of hydrogenation of TCPD (IV), perhydro-4,9-methano-5,8-methano-benzo[b]indene may be obtained as by-product, since TCPD (IV) has two norbornene rings. Such perhydro compound should be removed from the reaction system before or after carboxylation because it can not be carboxylated in the reaction of this invention.

According to this invention, the starting compound (III) or (IV) is carboxlated or alkoxycarbonylated to give a rosin-like resinous carboxylic acid derivative wherein one of the vicinal carbon atoms in the olefinic group is carboxylated or alkoxycarbonylated and the other carbon atom is hydrogenated. Therefore, a monocarboxylic acid derivative is obtainable from the corresponding condensed cyclic alkene, and a dicarboxylic acid derivative is obtainable from the corresponding condensed cyclic alkadiene. But a monocarboxylated or alkoxycarbonylated compound can be selectively obtained from the latter, if the reaction is stopped at the early stage since the olefinic group of the norbornene ring is superior to that of the cyclopentene or cyclohexene ring in the reactivity as described above.

The carboxylation of this invention is not limitative, and there are exemplified the following procedures:

1. The starting compound (III) or (IV) is reacted with carbon monoxide or a carbon monoxide-generating substance under the condition of Reppe's reaction or oxo process.

The reaction is usually carried out by treating the starting compound (III) or (IV) with water and carbon monoxide under an elevated pressure in the presence of a catalyst comprising a metal of the eighth group of the periodic table such as a cobalt salt (e.g. cobalt carbonate, cobalt acetate), a nickel salt (e.g. $NiI_2$, $NiBr_2$, $NiBr_2[(C_6H_5)_3P]_2$), or a metallic carbonyl (e.g. cobalt carbonyl, nickel carbonyl, rhodium carbonyl). The addition of an amine such as pyridine, palladium and hydrochloric acid or boric acid may enhance the catalytic activity of the said catalyst. It is preferable to conduct the reaction at a higher temperature under a higher pressure when the reaction is carried out in the presence of the said nickel salt.

According to this method, the amount of a carboxyl group introduced to the starting compound can be determined by controlling the absorbed amount of carbon monoxide. Therefore, the mono and dicarboxylated compounds may be prepared in a predetermined ratio.

The starting compound (III) or (IV), carbon monoxide and water may be reacted in the presence of an acid catalyst under an elevated pressure to give the corresponding carbonyl compound, followed by hydrolysis of the carbonyl group to carboxyl. Suitable acid catalysts include, for example, sulfuric acid, phosphoric acid, hydrofluoric acid, boron trifluoride, etc. A carbon monoxide-generating substance such as formic acid may be reacted in the presence of the said acid catalyst or a peroxide.

Further, the starting compound and carbon monoxide or a carbon monoxide-generating substance may be reacted with hydrogen or an alcohol to give the corresponding aldehyde or acid ester as intermediates under the condition of oxo process, and then the intermediates can be converted to the corresponding carboxylic acid by oxidizing or hydrolyzing. In this case, the oxo process reaction may be carried out under an elevated pressure in the presence of a cobalt catalyst such as a cobalt carbonyl (e.g. dicobaltoctacarbonyl), a cobalt salt (e.g. cobalt carbonate, cobalt acetate) or the like.

The oxidizing or hydrolyzing process may be effected by any known procedure. Suitable oxidizing procedures include, for example, catalytic oxidation using as a catalyst silver oxide, platinum on carbon, platinum oxide, palladium or the like, chromic acid mixture oxidation, alkaline or acid permanganate oxidation, alkali oxidation, etc. Hydrolyzing may be effected in the presence of an acid or a base. In acidic hydrolysis, there may be used sulfuric acid, hydrochloric acid, nitric acid, acetic acid, aromatic sulfonic acid or the like. In alkaline hydrolysis, alkali metal hydroxide (e.g. sodium hydroxide, potassium hydroxide) or alkaline earth metal hydroxide (e.g. barium hydroxide) is usually employed.

2. The starting compound (III) or (IV) is converted into the corresponding hydrohalogenated compound by reacting with a hydrohalogenating agent which is usually applied for hydrohalogenation to an olefinic group, followed by the conversion into the corresponding cyanide. Thus obtained cyanide is hydrolyzed to the objective compound (I) or (II). The hydrohalogenation is usually carried out with hydrogen halide such as hydrogen chloride or hydrogen bromide, etc.

The cyanogenation is carried out with a cyan ion-generating agent such as hydrocyanic acid or metallic cyanide. Suitable metallic cyanides include, for example, alkalimetal cyanide (i.e. sodium cyanide, potassium cyanide), alkaline earth metal cyanide (e.g. copper cyanide), etc. The substitution may be effected at about 100°C, preferably in a polar solvent such as dimethylsulfoxide, when alkali metal cyanide is applied in the reaction. Cyanogenation may also be conducted in such a manner that the hydrohalogenated compound is dissolved in an organic solvent and a solution of alkali metal cyanide in water is added thereto, whereby cyan ion is moved from the water layer to the organic solvent layer in the presence of an ammonium salt such as tricaprylmethylammonium or a phosphonium salt such as hexadecyltributylphosphonium bromide as described in the Journal of the American Chemical Society, Vol. 93, page 195 (1971). The hydrolysis may be carried out by a conventional procedure as explained in the hydrolysis of the ester.

3. The starting compound is hydrohalogenated as described above and then converted to the corresponding magnesium halide by reacting with metallic magnesium. Thus prepared Grignard's Reagent is then reacted with carbon dioxide in a conventional manner to give the objective compound (I) or (II).

4. The starting compound is directly hydrocyanated with hydrocyanic acid and then hydrolyzed to give the objective compound (I) or (II). The hydrocyanation is usually carried out in the presence of a suitable catalyst such as dicobaltoctacarbonyl, palladium triphenylphosphite or nickel triphenylphosphite, etc. Hydrolysis is carried out by a conventional method as mentioned before.

5. Further, the starting compound may be reacted with formic acid in the presence of sulfuric acid or with lithium carbenoid to prepare the condensed dihalocyclopropane compound, followed by the reaction with sulfuric acid. In such process, the reaction temperature, the reaction pressure, the solvent and the catalyst may be appropriately selected depending on the reactivity of the starting compound.

In the said carboxylation, either one or both of the mono- and di-carboxylic acids may be prepared by controlling the reaction condition. Though a mixture of the monocarboxylic acid and the dicarboxylic acid can be used as such for preparation of the emulsifying composition of this invention, the mono carboxylic acid may be preferably separated from the dicarboxylic acid.

Thus obtained carboxylated compound (I) and (II) are generally pale yellowish to brown and form a transparent glassy thermoplastic resin. In general, the softening point, the number average molecular weight and the acid value of the carboxylated compounds are respectively about 40° – 100°C, 230 – 346 and 160 – 490, though variation may occur depending on the purity. Generally, the softening point is elevated with the increased proportion of the dicarboxylated compound.

The alkoxycarbonylation may be effected by direct esterification on the olefinic group, or interesterification or esterification for the carboxyl group in a conventional manner. Esterification for the carboxyl group is usually carried out by reacting with an alcohol such as methanol, ethanol, propanol, isopropanol, ethyleneglycol, trimethylol propane, glycerol or pentaerythritol. Polyesters may be prepared when polyhydric alcohols are used in the esterification.

As hereinafter disclosed, a composition containing the resin of the general formula (I) or (II) can be used in various field as a substitute for rosin or its derivatives. Particularly, a composition comprising a water soluble salt of the resin (I) or (II) is useful as an emulsifying agent in the emulsion polymerization for producing synthetic rubber.

The carboxylated compounds are converted to their water soluble salts for the use as an emulsifying agent. Suitable water soluble salts include, for example, alkali metal salts (e.g. sodium, potassium salts), ammonium salt, amine salts such as alkylamine salts (e.g. methylamine, ethylamine, dimethylamine, trimethylamine, triethylamine, dipropylamine, monobutylamine, dibutylamine, tributylamine salts), polyamine salts (e.g. ethylenediamine, diethylenetriamine, triethylenetetramine salts), hydroxyalkylamine salts (e.g. ethanolamine, diethanolamine, triethanolamine, triisopropanolamine, N,N-dimethylethanolamine, N-methyl-N,N-diethanolamine salts) and morpholine salt, and the like.

The emulsifying composition of this invention comprises at least one of the salt water soluble salts of the carboxylated compounds. When desired, it may contain any other conventional emulsifying agent(s) such as beef tallow soap, etc. or a dispersant(s) such as sodium alkylsulfonate or sodium alkylarylsulfonate.

In the emulsion polymerization for production of synthetic rubbers such as styrene-butadiene rubber, chloroprene rubber, polybutadiene rubber and acrylonitrile-butadiene-styrene rubber, the emulsifying composition of this invention may be used in the form of an aqueous dispersion containing the said water-soluble salt of the resin (I) or (II) dispersed in water. Alternatively, the said water salt of the resin (I) or (II) may be employed in a powder form. The salt of the resin (I) or (II) has a good water-solubility at a low temperature, and the aqueous dispersion is excellent in storage stability at a low temperature. Therefore, the emulsifying composition can be effectively used for producing cold rubber. Further, the resin (I) or (II) has a property to impart a better tackiness to synthetic rubbers than rosin soaps, and synthetic rubbers having an excellent amenability to processing is obtainable by its use. Furthermore, the emulsifying composition is light in color and excellent in thermal and weather resistances so that, when used in the emulsion polymerization, the produced rubbers have light color and are excellent in thermal and weather resistances.

In addition to the use in the emulsion polymerization for production of synthetic rubbers, the emulsifying composition of this invention may be employed as an emulsifying agent for insecticides, germicides, herbicides, fiber treating agents, wax sizing agents, cleaners, grazing agents, cutting oils and the like.

Further, the alkoxycarbonylated compound (I) or (II) is useful as a pressure sensitive adhesive when combined with natural rubber or synthetic rubber, since it gives a tackifying property to the said rubber.

Generally, tackifiers for pressure sensitive adhesives are required to have the balanced tackiness, adhesion and cohesion. Among commercial tackifiers, rosin ester has been the most broadly utilized due to its excellent tackiness in various blending ratios. The use of petroleum resin has been restricted due to its inferior adhesion and cohesion, although it has an excellent tackiness. The ester of the resin (I) or (II) of this invention is excellent not only in tackiness but also in adhesion and cohesion and may be favorably employed in place of commercial tackifiers, particularly rosin ester.

The said advantageous properties of the resin (I) or (II) of this invention may be attributable to that the molecular weight of the resin (I) or (II) is not widely distributed and thus an excellent compatibility with rubber is possessed. So, it is important in this invention to prepare the resin (I) or (II) in high purity.

The resin (I) or (II) in the form of a glycerin ester is further utilized in place or rosin glycerin ester in hot melt adhesives, lacquers, paints or hot melt type, etc. In the case of hot melt adhesives, the glycerin ester, especially glycerin ester of dihydro TCPD (I) monocarboxylic acid, may be preferably blended with ethylene-vinyl acetate copolymer and waxes. In the case of lacquers, the glycerin ester may be favorably blended with nitrocellulose and plasticizers in the presence of polar solvents.

The properties of the resin (I) or (II) may be, if necessary, further improved by hydrogenation thereof. The hydrogenation can be conducted in the same manner as known in the art. For example, the resin (I) or (II) which still has an olefinic group is placed in a pressure container such as an autoclave in the form of solvent solution or of molten state. Examples of the solvent are benzene, toluene, xylene, isohexane, cyclohexane, etc. Thereafter, the resin (I) or (II) is brought into contact with hydrogen gas in the presence of a catalyst at 10 to 500 Kg/cm$^2$ of hydrogen pressure at 150° to 300°C. Examples of the catalyst are metals (e.g. nickel, cobalt, molybdenum, palladium copper, chromium, ruthenium) and their oxides.

When a composition containing the alkali salt of such hydrogenated resin dispersed in water is used as an emulsifier in the emulsion polymerization for producing synthetic rubbers, the resultant rubbers have lighter color and more excellent thermal and weather resistances.

Examples of this invention are given below for a better understanding of the invention, in which all percentages are by weight.

EXAMPLE 1

1. Preparation of TCPD

In a 3 liter autoclave were charged 500g of DCPD (95per cent pure) and 600g of xylene. After the air in the autoclave was displaced with nitrogen gas, the resultant mixture was reacted at 190°C for 2 hours. The reaction mixture was distilled under reduced pressure to remove xylene and unreacted materials. The residue was further distilled to obtain 450 g of TCPD as a main product. B.P. 110° – 120°C/3mmHg. Number average molecular weight was 195. By gas chromatography, it was confirmed that the thus obtained TCPD consisted of 3a,4,4a, 5,8,8a,9,9a-octahydro-4,9-methano -5,8-methano-1H-benzo[b]indene (abbreviated as TCPD(III) hereinafter) and 1,4,4a,4b, 5,8,8a,9a-octahydro-1,4-methano-5,8-methano-9H-fluorene (abbreviated as TCPD(IV) hereinafter) in a weight ratio of 88 : 12.

2. Carboxylation of TCPD

In a 1 liter autoclave were charged 100 g of TCPD, 36g of water, 24g of pyridine, 5.1g of dicobaltoctacarbonyl and 160g of benzene. After the air in the autoclave was displaced in carbon monoxide gas, the inner pressure of the autoclave was adjusted to 110kg/cm² with the same. The resultant mixture was heated at 160°C for 2 hours with stirring. After the reaction was over, the reaction mixture was washed with dilute hydrochloric acid. The benzene layer was washed with water and dried. Then, benzene was distilled off to obtain 124g of a resinous product. Thus obtained resinous product was a yellowish, transparent and glassy resin. Softening point, 74°C (by ring and ball method, the same as hereinafter). Acid value, 215. Number Average molecular weight, 250 (cryoscopic method, the same as hereinafter). The resin consisted of 1,3a,4-4a,5,6(or 7),8,8a,9,9a-decahydro-4,9-methano-5,8-methanobenzo[b]indene-7(or 6)-carboxylic acid (abbreviated as TCPD(III) monocarboxylic acid hereinafter) and 1,2(or 3),4,4a,4b, 5,6(or 7),8,8a,9a-decahydro-1,4-methano-5,8-methano-9H-fluorene-3(or 2), 7(or 6)-dicarboxylic acid (abbreviated as TCPD(IV) dicarboxylic acid hereinafter).

EXAMPLE 2

1. Hydrochlorination of TCPD

In a 0.5 liter flask were charged 100 g of TCPD obtained in the same way as in Example 1. After 300 g of 35 % aqueous solution of hydrochloric acid was added in the flask, the resultant mixture was heated at 80°±2°C for 5 hours with stirring. After the reaction was over, the reaction mixture was extracted with xylene. The xylene layer was sufficiently washed with water and dried over. Unreacted materials were distilled off under reduced pressure, and the residue was further distilled at 119°–120°C/1mmHg to obtain 81g of 1,3a,4,4a,5,6(or 7), 8,8a,9,9a-decahydro-7(or 6)-chloro-4,9-methano-5,8-methanobenzo[b]indene(abbreviated as TCPD(III)monohydrochloride hereinafter). In the infra-red absorption spectrum, the double bond of the norbornene ring disappeared and the C—Cl bond appeared. The result of the elementary analysis corresponded to $C_{15}H_{19}Cl$.

2. Cyanation of TCPD(III)monohydrochloride

In an autoclave were charged 70g of TCPD chloride, 36g of copper cyanide and 50g of pyridine. Reaction was carried out under reflux for 24 hours with stirring. After the reaction was over, the reaction mixture was cooled to 100°C and were added 50g of benzene and 150ml of aqueous ammonia solution. The benzene layer was filtered and washed with aqueous ammonia solution, aqueous hydrochloric acid solution and water in order. Then, benzene and unreacted materials were distilled off and the residue was distilled at 130°–140°C/mmHg to obtain 1,3a,4,4a, 5, 6(or 7),8,8a,9,9a-decahydro-7(or 6)-cyano-4,9-methano-5,8-methanobenzo[b]indene (abbreviated as TCPD(III) monocyanate hereinafter). In the infra-red absorption spectrum, the C—Cl bond disappeared and the —CN bond appeared. The result of the elementary analysis corresponded to $C_{16}H_{19}N$.

3. Hydrolysis of the TCPD(III)monocyanate

Fifty grams of thus obtained TCPD(III)monocyanate were charged in an autoclave, and aqueous potassium hydroxide solution was added to the autoclave. After the resultant mixture was heated at 200°C with stirring, cold water was added. Occuring ammonia gas was removed to obtain a yellowish transparent soap solution. Thus obtained soap solution was acidified with aqueous hydrochloric acid solution and the resultant resin was extracted with benzene. The resultant resin was 1,3a,4, 4a,5,6(or 7),8,8a,9,9a-decahydro-4,9-methano-5,8-methanobenzo[b]indene-7(or 6)-carboxylic acid (abbreviated as TCPD(I) monocarboxylic acid hereinafter). Acid value, 220. Softening point, 64°C. Number average molecular weight, 246.

EXAMPLE 3

1. Methoxycarbonylation of TCPD

In a 1 liter autoclave were charged 100 g of TCPD obtained in the same way as in Example 1, 65 g of methanol, 50g of pyridine, 2.5g of dicobaltoctacarbonyl and 200g of xylene. After the initial pressure of the autoclave was adjusted to 100Kg/cm² with carbon monoxide gas, the resultant mixture was heated for 2 hours at 160°C with stirring. The reaction mixture was washed with dilute hydrochloric acid solution to decompose and remove the catalyst, and then the xylene layer was washed with water and dried over. Then, the xylene and unreacted materials were distilled off. Sixty grams of the objective compound were obtained as balsamic material by further distillation at 135°–150°C-/1–1.5mmHg. This compound had a molecular weight of 262 and a saponification value of 210. In the infrared absorption spectrum, the absorption of the ester group (1760 $cm^{-1}$) and the double bond of the cyclopentadiene ring (700 $cm^{-1}$) were confirmed. Whereby, the product was found to be 1,3a,4,4a,5,6(or 7),8,8a,9-9a-decahydro-4,9-methano-5,8-methanobenzo[b]indene-7-(or 6)-carboxylic acid methyl ester (abbreviated as methoxycarbonyl TCPD(1) hereinafter).

2. Preparation of potassium salt of TCPD(1)-monocarboxylic acid

To 50g of methoxycarbonyl TCPD(I) was slowly added 21.9g of 48% aqueous solution of potassium hydroxide. The resultant mixture was subjected to hydrolysis at 140°C with stirring till methanol was thoroughly distilled off. Water was slowly added to the reaction mixture with stirring to obtain a cooled 25 % soap solution which was a pale brown, transparent solution. The pH of 10 % aqueous soap solution was 10.5. Thus obtained soap solution can be utilized as the emulsifying composition. In order to examine the properties and characteristics of the free TCPD(I) monocarboxylic acid, the soap solution was acidified with aqueous hydrochloric acid solution and extracted with toluene. The extracted compound was a yellowish, transparent resin and had an acid value of 224 (theoretical acid value, 230.9), a softening point of 57°C and a number average molecular weight of 246.

EXAMPLE 4

Carboxylation of TCPD of Grignard Reaction

In the same way as in Example 2, TCPD(III) monohydrochloride was prepared. In a 0.5-liter five-necked flask equipped with a stirrer, a thermometer, a reflux condenser, a dropping funnel and an inlet for nitrogen gas were charged 100 g of diethylether and 5.0 g of ribbon-like metallic magnesium. After the air in the flask was displaced with nitrogen gas, the resultant mixture was subjected to Grignard Reaction by adding dropwise 0.5 g of ethylbromide at 25°–30°c with stirring. When the Grignard Reaction was started, 47 g of TCPD(I) monohydrochloride was added dropwise to the flask at 30°±2°C over 2 hours. Then, 100 g of diethylether was added and after the reaction mixture was cooled to 5°C, 15 liters of carbon dioxide gas were introduced in the flask over 30 minutes at the same temperature. Thereafter, 100 g of 3 % aqueous solution of hydrochloric acid was added dropwise over 10 minutes with stirring to complete the reaction. The oily layer of the reaction mixture was washed with water to adjust pH 6, dried over anhydrous sodium sulfate, distilled to remove diethylether at the atmospheric pressure and then further distillated to remove the low boiling point materials 80°–130°C/1mmHg, whereby 33 g of a page yellowish, transparent, glassy resin was obtained as the residue. Thus obtained resin had a softening point of 70°C, an acid value of 221, a color tone of less than one (gardner scale, the same as hereinafter) and a number average molecular weight of 252. The resin was found to be TCPD(I) monocarboxylic acid.

EXAMPLE 5

1. Preparation of the catalyst

In a 1 liter autoclave were charged 300 g of benzene and 60 g of cobalt carbonate. After the inner pressure of the autoclave was adjusted to 160 Kg/cm$^2$ with a mixed gas of CO/H$_2$ (1/1), the resultant mixture was heated at 160°C for 3 hours to obtain a benzene solution of dicobaltoctacarbonyl.

2. Oxo process of TCPD

In a 1 liter autoclave were charged 200 g of TCPD obtained in the same manner as in Example 1, 200 g of benzene and 50 ml of a benzene solution of dicobaltoctacarbonyl obtained by the process (1). After the inner pressure of the autoclave was adjusted to 160 kg/cm$^2$ with a mixed gas of CO/H$_2$ (1/1), the resultant mixture was heated at 120°C for an hour with stirring and cooled. The inner pressure was reduced as the reaction proceeded at 120°C, while blowing of the said gas was once completed during the course of 1 and 1.5 hours, and then the blowing of the said gas was observed again. Therefore, the reaction was preferably completed just before the beginning of the second blowing and cooled. Then, the residual gas was discharged and the inner pressure of the autoclave was adjusted to 100 Kg/cm$^2$ with hydrogen gas. Then, the resultant mixture was heated at 200°C for 30 minutes with stirring to decompose a large portion of the catalyst. After cooling, the reaction mixture was washed with 5 % aqueous solution of hydrochloric acid and hot water till pH was adjusted to 6, and then dried over anhydrous sodium sulfate. The oily layer was subjected to distillation to remove benzene under atmospheric pressure and then a portion of unreacted materials under reduced pressure. One hundred and twentyfive grams of the objective compound were obtained by further distillation at 170°–180°C/4-6mmHg. The result of the elementary analysis corresponded to C$_{16}$H$_{20}$O. In the infra-red absorption spectrum, the absorption of the aldehyde group was observed. This compound was 1,3a,4,4a,5,-6(or 7 ),8,8a,9,9a-decahydro-4,9-methano-5,8-methanobenzo[b]-indene-7(or 6)-aldehyde (abbreviated as TCPD(III) monoaldehyde hereinafter). The resulting TCPD(III) monoaldehyde was subjected to oxidation in a conventional method to obtain TCPD(I) monocarboxylic acid. This compound was a yellowish transparent, glassy resin and had a softening point of 74°C, an acid value of 218.5, a molecular weight of 248 and a gardner color tone of 1. Besides, perhydro-4,9-methano-5,8-methanobenzo[b]indene-2(or 3),6(or 7)-dicarboxylic acid(abbreviated as TCPD(I)-dicarboxylic acid hereinafter) was obtained when an excess amount of carbon monoxide gas was absorbed in the said reaction system.

EXAMPLE 6

1. Cyanation of TCPD

In a 1 liter autoclave were charged 100 g of TCPD obtained in the same way as in Example 1, 100 g of benzene, 15 g of hydrogen cyanide, 6.7 g of Pd[P(OPh)$_3$]$_4$ and 46.5 g of P(OPh)$_3$. The resultant mixture was heated at 130°C for 8 hours. After cooling, the reaction mixture was washed with 2 % aqueous solution of sodium hydroxide, water, 2 % aqueous solution of hydrogen chloride and water successively, and then was dried over anhydrous sodium sulfate. The resultant oily layer was distilled under an atmospheric pressure to remove the benzene and low boiling point materials. Seventy four grams of the objective compounds were obtained by further distillation at 130°–140°C/1mmHg. The product was found to be 1,3a,4,4a,5,6(or 7), 8,8a,9,9a-decahydro-7(or 6)-cyano-4,9-methano-5,8-methanobenzo[b]indene (abbreviated as TCPD(I) monocyanate hereinafter) by the infra-red absorption spectrum and the elementary analysis.

2. Hydrolysis of TCPD(I) monocyanate

Fifty grams of thus obtained TCPD(I) monocyanate were charged in a 0.3 liter flask equipped with a stirrer, a thermometer, a dropping funnel and a reflux condenser. Twenty grams of 48 % aqueous solution of potassium hydroxide were added dropwise to the flask over about one hour at 160°–180°C with stirring, and the resulting mixture was kept at the same temperature for one hour with stirring. Thereafter, 50 g of deionized water were added dropwise thereto over one hour at 140°–160°C, and then 50 g deionized water were further added dropwise at 100°C. The resultant paste was agitated along with the addition of 200 g of xylene and 100 g of 10 % aqueous solution of hydrochloric acid. After standing, the separated oily layer was washed with hot water to make pH 6 and dried over anhydrous sodium sulfate. The xylene was distilled off under a reduced pressure to obtain 42 g of TCPD(I) monocarboxylic acid as residue. This was a pale yellowish transparent and glassy resin, and had a softening point of 76°C, an acid value of 222, a gardner color tone of 3 and a molecular weight of 248.

EXAMPLE 7

1. Preparation of dihydro-TCPD

In a 2 liter autoclave were charged 396g of TCPD obtained in the same way as in Example 1, 396 g of cyclohexane and 0.4 g of 5 % palladium carbon. After the air in the autoclave was displaced with hydrogen gas, the inner pressure of the autoclave was adjusted to 20 Kg/cm$^2$ with hydrogen gas. The resultant mixture was heated at 100°C for 30 minutes with stirring. After cooling, the catalyst was filtered off and cyclohexane was distilled off to give 395 g of a mixture of dihydro TCPD and a small amount of tetrahydro TCPD. In the infra-red absorption spectrum, the absorption of the double bond of the norbornene ring disappeared and that of the cyclopentene ring appeared.

2. Carboxylation of dihydro-TCPD

In a 1 liter autoclave were charged 100g of thus obtained dihydro-TCPD, 100g of benzene, 3g of dicobaltoctacarbonly, 50g of water and 50g of pyridine. The inner pressure of the autoclave was adjusted to 180Kg/cm$^2$ with carbon monoxide gas, and then the resultant mixture was heated at 180°C for 5 hours with stirring. After the reaction was over, the catalyst was decomposed with dilute hydrochloric acid solution. Then, the reaction mixture was washed with water and dried over. Benzene and the unreacted materials were distilled off to obtain 102 g of perhydro-4,9-methano-5,8-methanobenzo[b]indene-2(or 3) carboxylic acid (abbreviated as dihydro TCPD(I) monocarboxylic acid hereinafter). This compound was a pale yellowish resin and had a softening point of 60°C and an acid value of 218. In the infra-red absorption spectrum, the absorption of the carboxyl group disappeared and that of the double bond of the cyclopentene ring was observed.

EXAMPLE 8

Carboxylation of dihydro TCPD

In a 1 liter autoclave were charged 200g of dihydro TCPD obtained in the same way as in Example 7, 200 g of benzene and 40 g of dicobaltoctacarbonyl. After the inner pressure of the autoclave was adjusted to 160 Kg/cm$^2$ with CO/H$_2$ (1/1), the resultant mixture was heated to 150°C for 3 hours with stirring. After cooling, the residual gas in the autoclave was discharged, the inner pressure of the autoclave was adjusted again to 100 Kg/cm$^2$ with hydrogen gas. The reaction mixture was stirred for a moment at 200°C. After cooling the reaction mixture was washed with aqueous hydrochloric acid solution and water and then dried over. Thereafter, the benzene was distilled off. One hundred and one grams of the objective compound were obtained by further distillation at 172°-182°C/4-6mmHg. Thus obtained compound was perhydro-4,9-methano-5,8-methanobenzo[b]indene-2(or 3)-aldehyde (abbreviated as dihydro TCPD(I) monoaldehyde hereinafter). Then, dihydro TCPD(I) monoaldehyde was converted to dihydro TCPD(I) monocarboxylic acid by a conventional oxidation procedure. This compound was a yellowish transparent and glassy resin and had a softening point of 70°C and an acid value of 214.

EXAMPLE 9

1. Preparation of dihydro TCPD carboxylic acid methylester

In a 1 liter autoclave were charged 100g of TCPD obtained in the same way as in Example 7, 100 g of benzene, 5g of dicobaltoctacarbonyl, 64g of methanol and 25g of pyridine. After the inner pressure of the autoclave was adjusted to 150 Kg/cm$^2$ with carbon monoxide gas, the resultant mixture was heated at 180°C for 5 hours with stirring. After the reaction was over, the catalyst was decomposed with dilute hydrochloric acid solution and then removed. The reaction mixture was washed with water, and then the solvent and unreacted materials were distilled off to obtain 180 g of a yellowish and balsamic material as residue. This material had an acid value of less than 1 and a saponification value of 208. In the infra-red absorption spectrum, the absorption of the ester group (1760 cm$^{-1}$) was observed while that of the double bond of the cyclopentene ring (700 cm$^{-1}$) disappeared. Accordingly, this material was found to be perhydro-4,9-methano-5,8-methanobenzo[b]indene-2(or 3)-carboxylic acid methylester (abbreviated as dihydromethoxycarbonyl TCPD(I) hereinafter).

2. Preparation of potassium salt of dihydro TCPD(I) monocarboxylic acid

Fifty grams of thus obtained dihydromethoxycarbonyl TCPD(I) were slowly added to 21.7 g of 48% aqueous solution of potassium hydroxide. The mixture was subjected to hydrolysis at 140°C with stirring till methanol was not distilled off. Then, water was slowly added into the reaction mixture with stirring to prepare 25 % soap solution. Thus obtained soap solution was a pale brown transparent solution, and the pH of 10 % solution was 10.6.

The soap solution was acidified with dilute hydrochloric acid solution, followed by extracting the resin with toluene. The said resin had an acid value of 220 and a softening point of 47°C. This resin was found to be perhydro TCPD(I) monocarboxylic acid.

EXAMPLE 10

1. Preparation of polycyclic olefin 3a,4,7,7a-THI (90% purity) was prepared through the fractional distillation of the material which was prepared by reacting butadiene with CPD. During 10 mols of the said 3a,4,7,7a-THI was heated to 130°C with stirring, 3 mols of DCPD which was adjusted to the same temperature was added dropwise over 6 hours. The resultant compound was subjected to the frictional distillation to obtain the distillate of 90°-110°C/10mmHg. By gas chromatography and NMR analysis, the main component of thus obtained distillate was confirmed to be a co-trimer of 3a,4,7,7a-THI and CPD in an equimolar amount.

2. Carboxylation of the co-trimer

In a 2 liter autoclave were charged 130g of thus obtained co-trimer, 130g of benzene, 6.5g of dicobaltoctacarbonyl, 65g of water and 35g of pyridine. After the inner pressure of the autoclave was adjusted to 180 Kg/cm$^2$, the resultant mixture was heated at 160°C for 3 hours with stirring. After the reaction was over, the catalyst in the resultant mixture was decomposed with sulfuric acid solution and removed. Thus obtained liquid was washed with water and then dried over. Thereafter, the solvent and unreacted material were distilled off to obtain 121 g of a pale yellowish resin as residue. This resin had a softening point of 82°C and an acid value of 241. In the infra-red absorption spectrum, the absorption of the carboxyl group was observed and that of the double bond of the norbornene ring disappeared. This resin was found to be a mixture of 1,2(or 3),4,4a,-4b,5,8,8a,9,9a-decahydro-1,4-methanofluolene-3(or 2)-carboxylic acid and 3a,4,5,6(or 7),8,8a,9,9a-octahydro-5,8-methano-1H-benzo[b]indene-7(or 6)-carboxylic acid.

EXAMPLE 11

Carboxylation via methylester of co-trimer monocarboxylic acid

In a 2 liter autoclave were charged 200g of co-trimer obtained in the same way as in Example 10, 200 g of xylene, 5g of dicobaltcarbonyl, 128g of methanol and 50g of pyridine. After the inner pressure of the autoclave was adjusted to 180 Kg/cm² with carbon monoxide gas, the mixture was heated at 145°C for 3 hours with stirring. After the reaction was over, the catalyst in the resultant mixture was decomposed with dilute sulfuric acid solution and removed. Thus obtained liquid was washed with water and dried over. Then the liquid was subjected to distillation under reduced pressure to remove methanol, pyridine and unreacted materials. The objective compound was obtained by further distillation at 95°–110°C/1mmHg. Thus obtained product had no acid value and a saponification value of 220. In the infra-red absorption spectrum, the absorption of the ester group was observed and that of the double bond of the norbornene ring disappeared. Accordingly, the product was found to be 1,2(or 3), 4,4a,4b,5,8,8a,-9,9a-decahydro-1,4-methanofluonene-3(or 2)-carboxylic acid methyl ester. Thus obtained product wad acidified and extracted with benzene. Benzene was distilled off to obtain a pale yellowish transparent resin. This resin had a softening point of 52°C and an acid value of 231. This compound was 1,2(or 3),4,4a,4b,5,-8,8a,9,9a-decahydro-1,4-methanofluorene-3(or 2)-carboxylic acid.

EXAMPLE 12

1. Preparation of the methyl substituted co-trimer

In a 10 liter autoclave were charged 1030 g of isoprence, 1000g of CPD and 2 liters of methano, and the resultant mixture was heated at 270°C for an hour. After the reaction was over, the reaction mixture was subjected to distillation to obtain 992g of the distillate at 50°–75°C/20mmHg. Thus obtained distillate contained 72% of 5(or 6)-methyltetrahydro-indene, and the residue was the mixture of various coordinated isomer of co-dimer. To 670g of this distillate which kept at 240°C with stirring, 200g of CPD was added dropwise over 3 hours, then the resultant mixture was further heated at the same temperature for an hour. The reaction mixture was subjected to distillation to remove unreacted materials and the residue was further distillated at 80°–130°C/5mmHg to obtain a distillate. By a conventional analytical procedure, it was ascertained that the distillate was a mixture of 1,4,4a,4b,5,8,8a,9a-octadhydro-6(or 7)-methyl-1,4-methano-9H-fluorene and 1,3a,4,5,8,8a,9,9a-octahydro-4a-methyl-5,8-methanobenzo[b]indene.

2. Cycanation of the methyl substituted co-trimer

In a 1 liter autoclave were charged 100g of thus prepared distillate, 100g of benzene, 5g of hydrogen cyanide, 8g of Pd[P(C₆H₅O)₃]₄ and 40g of P(C₆H₅O)₃. The resultant mixture was heated at 140°C with stirring. While the reaction was continued at the same temperature for 20 hours, 5g of hydrogen cyanide was added every 4 hours. The resultant mixture was washed with aqueous sodium hydroxide solution, aqueous hydrochloric acid solution and water in order and then subjected to distillation to obtain 60 g of the corresponding cyano compound at 130°–140°C/1mmHg. The elementary analysis and the infra-red absorption spectrum revealed that the resulted cyano compound was a mixture of 1,2(or 3),4,4a,4b,5,8,8a,9,9a-decahydro-3(or 2)-cyano-6(or 7)-methyl-1,4-methanofluorene and 3a,4,5,6(or 7),8,8a,9,9a-octahydro-4a-methyl-7 (or 6)-cyano-5,8-methano-1H-benzo[b]indene.

3. Carboxylation of the cyano compound

Fifty grams of the said cyano compound were heated at 170°C in a stainless-made flask equipped with a stirrer, and 25 g of 48 % aqueous solution of potassium hydroxide was added dropwise thereto over 1 hour. Then, 50 g of hot water was added to the reaction mixture, and the resultant mixture was diluted with water to obtain 150 g of a brown soap solution. The soap solution was acidified with dilute hydrochloric acid solution and extracted with benzene. A pale yellowish transparent resin was obtained by distilling off benzene. This resin was a mixture of 1,2(or 3),4,4a,4b,5,8,8a,9,9a-decahydro-6(or 7)-methyl-1,4-methanofluorene-3(or 2)-carboxylic acid and 3a,4,5,6(or 7),8,8a,9,9a-octahydro-4a-methyl-5,8-methano-1H-benzo[b]indene-7(or 6)-carboxylic acid which had an acid value of 218 and a softening point of 59°C.

EXAMPLE 13

1. Preparation of HHI-CPD adduct 3a,4,7,7a-THI obtained in the same way as in Example 10 was slightly hydrogenated in the presence of a palladium carbon catalyst to obtain a mixture containing 2,3,3a,4,7,7a-HHI and 3a,4,5,6,7,7a-HHI with a small amount of 3a,4,7,7a-THI. The mixture was heated at 240°C with stirring, and 260 g of DCPD was added dropwise over 6 hours at the same temperature. Then stirring and heating were continued for more than 1 hour. After the reaction was over, the reaction mixture was subjected to fractional distillation to remove unreacted materials and further distilled at 90°–110°C/10mmHg to obtain an equimolar adduct of HHI and CPD which had a number average molecular weight of 170.

2. Carboxylation of the HHI-CPD adduct

In a 2 liter autoclave were charged 200g of thus obtained HHI-CPD adduct, 200g of benzene and 20g of dicobaltoctacarbonyl. The inner pressure of the autoclave was adjusted to 160 Kg/cm², and then the resultant mixture was heated at 120°C for 3 hours with stirring. After the reaction was over, the catalyst in the resultant mixture was removed by a conventional method, and benzene and unreacted materials were removed by distillation. Further distillation at 190°–210°C/10mmHg gave the carbonyl compound as an intermediate. Thereafter, the intermediate was subjected to oxidation in a conventional method to obtain a pale yellowish transparent resin. Thus obtained resin had a softening point of 60°C and an acid value of 226. This resin was a mixture of perhydro-5,8-methanobenzo[b]indene-6(or 7)-carboxylic acid and perhydro-1,4-methano-fluorene-2(or 3)-carboxylic acid.

EXAMPLE 14

Carboxylation via methylester of methyl-substituted co-trimer

In a 2 liter autoclave were charged 200 g of methyl-substituted co-trimer prepared in the same way as in Example 12, 200g of xylene, 5g of dicobaltoctacarbonyl, 120g of methanol and 100g of pyridine. The inner pressure of the autoclave was adjusted to 100 Kg/cm$^2$ with carbon monoxide gas, and then the resultant mixture was heated at 145°C for 2 hours increasing the inner pressure to 120–130 Kg/cm$^2$. After the reaction was over, the catalyst in the reaction mixture was decomposed with dilute hydrochloric acid solution. Thus obtained liquid was washed with water and dried over. Then, the liquid was subjected to distillation to remove methanol, xylene and unreacted materials. The distillate was obtained by further distillation at 100°–120°C/1mmHg. This distillate had no acid value and a saponification value of 211. In the infra-red absorption spectrum, the absorption of the ester group was observed and that of double bond of the norbornene ring disappeared. Thereafter, this distillate was subjected to saponification in a conventional method with potassium hydroxide to obtain a soap solution.

A part of thus obtained soap solution was changed to the corresponding carboxylic acid compound in a conventional method to give a pale yellowish transparent resin. This resin had a softening point of 40°C and an acid value of 222. The results of the elementary analysis and the IR analysis showed that the main components of this resin were 1,2(or 3),4,4a,4b,5,8,8a,9,9a-decahydro-1,4-methano-6(or 7)-methylfluorene-3 (or 2)-carboxylic acid and 3a,4,5,6(or 7), 8,8a,9,9a-octahydro-4a-methyl-5,8-methano-1H-benzo[b]indene-9(or 6)-carboxylic acid.

COMPARATIVE EXAMPLE 1

1. Preparation of tetra CPD

After 450 g of TCPD was obtained by distillation in Example 1, the residue was further distilled under more reduced pressure to collect the distillate at 160°–180°C/10$^{-1}$–10$^{-2}$mmHg. The distillate was solidified and recrystallized from ether to remove a small amount of contaminated TCPD. The resultant crystals were confirmed to consist of 99.1 % of tetra CPD and 0.9 % of TCPD by gas chromatography. Melting point, 180°–190°C.

2. Carboxylation of tetra CPD

In a autoclave were charged 46 g of thus obtained crystals, 4.6 g of dicobaltoctacarbonyl, 32 g of pyridine, 22 g of methanol and 150 g of xylene, and then the resultant mixture was heated at 145°C for 2 hours under an initial pressure of 100 Kg/cm$^2$ while introducing carbon monoxide gas therein. After the reaction was over, the catalyst was decomposed with aqueous hydrochloric acid solution. Thus obtained xylene layer was washed with water, and then the solvent was distilled off, whereby 57 g of a white wax-like material was obtained. Thereafter, 30 g of thus obtained wax-like material, 6 g of pulverized potassium hydroxide and 140 g of water were charged in an autoclave, and saponification was carried out at 200°C for 2 hours. The reaction mixture was a paste-like material and changed to a slurry state by addition of water. This slurry was warmed and extracted twice with xylene to remove the unreacted hydrocarbon compound. The resultant aqueous slurry was acidified with aqueous hydrochloric acid solution and subjected to hydrolysis. After washing with water, the solvent was removed to obtain 20 g of pale yellowish crystals, which had a melting point of 230°C, an acid value of 175 and a molecular weight of 310. The results of the elementary analysis and the IR analysis showed that the main component was the compound carboxylated to the unsaturation of the norbornene ring in tetra CPD. The potassium salt of this crystalline material was slightly soluble in water.

COMPARATIVE EXAMPLE 2

1. Preparation of dihydro tetra CPD

In an autoclave were charged 100 g of tetra CPD obtained in the same way as in Comparative Example 1, 100 g of palladium carbon catalyst and 1000 g of cyclohexane, and the resultant mixture was subjected to hydrogenation for 90 minutes at 60°C under a pressure of 30 Kg/cm$^2$ with hydrogen gas. After the reaction mixture was filtered to remove the catalyst, the solvent was distilled off to obtain white crystals, which had a bromine value of 59. The main component was dihydro tetra CPD.

2. Carboxylation of dihydro tetra CPD

In an autoclave were charged 46 g of dihydro tetra CPD, 4.6 g of dicobaltoctacarbonyl, 23 g of pyridine, 22 g of methanol and 150 g of xylene, and the resultant mixture was heated at 160°C for 7 hours under an initial pressure of 100 Kg/cm$^2$ with carbon monoxide gas. After the reaction was over, the catalyst in the reaction mixture was decomposed with aqueous hydrochloric acid solution and removed. Then the reaction mixture was subjected to distillation to remove the solvent. Further distillation was conducted to give 56 g of the distillate which was a white wax-like material. Thirty grams of this material were charged in an autoclave with 6 g of pulverized potassium hydroxide and 140 g of water, and then the resultant mixture was subjected to saponification for 2 hours at 200°C. Thus obtained compound was a paste-like material and changed to a slurry state by addition of water. This slurry was extracted with hot xylene to remove unsaponified materials. The resultant aqueous soap solution was acidified with hydrochloric acid to saponify. Then, xylene was distilled off to obtain 18 g of pale yellowish or white crystals, which had a melting point of 220, an acid value of 172 and a molecular weight of 313. The results of the elementary analysis and the IR analysis showed that the crystal was the compound carboxylated to the unsaturation of dihydro tetra CPD. The potassium salt of this crystalline material was slightly soluble in water.

EXAMPLE 15

1. Preparation of an emulsifying composition

To each of the carboxylated compounds obtained in

Examples 1 to 8 and 10 to 13 was added dropwise 48 % aqueous potassium hydroxide solution in an amount equivalent to the acid value of the carboxylated compound. The resultant mixture was heated with stirring and diluted with water to give an aqueous composition of the carboxylated compound in a concentration of 25 %. Besides, each of the soap solutions obtained in Examples 9 and 14 was diluted with water to give an aqueous composition of the carboxylated compound in a concentration of 25 %. Each composition possessed a critical micelle concentration of less than 1 % in water, was used as an emulsifying agent in the emulsion polymerization for production of styrene-butadiene rubber. The conversion and the stability of the latex were respectively as shown in Tables 1 and 2.

On the other hand, tetra CPD carboxylic acid (Comparative Example 1) and dihydro tetra CPD carboxylic acid (Comparative Example 2) had high melting points, and their alkali salts were not soluble in cold water and could not be utilized as emulsifying agents.

2. Formulation for polymerization

Table 1

| Materials used | Names of materials used | Amounts parts by weight |
|---|---|---|
| Monomer | Butadiene | 70 |
|  | Styrene | 30 |
| Dispersing medium | Deionized water | 200 |
| Emulsifying agent | Aqueous solution of resin of each Example (as solid) | 4.0 |
|  | Naphthalene-formaldehyde resin sodium sulfate | 0.15 |
| Molecular weight regulating agent | Tertiary dodecylmercaptan | 0.245 |
| Polymerization initiator |  |  |
| Oxidizing agent | p-Menthane hydroperoxide | 0.104 |
| Reducing agent | Ferrous sulfate (heptahydrate) | 0.05 |
| Secondary reducing agent | Sodium formaldehyde sulfoxylate | 0.15 |
| Chelating agent | EDTA-4Na | 0.07 |
| Electrolyte | Sodium phosphate (dodecahydrate) | 0.8 |
| Polymerization conditions |  |  |
| Polymerization temperature : 5°C |  |  |
| Conversion : 60% |  |  |
| In nitrogen atomosphere |  |  |

3. Stability of latex i. Fifty grams of 25 % aqueous solution of the latex obtained in the above polymerization were charged in a bottle. After the inner atmosphere of the bottle was displaced with nitrogen gas, the bottle was shaken for 5 minutes at 25°C. The resulting coagulum (1) was filtered by a 80-mesh stainlessmade screen and dried to determine the percentage of the coagulum formed.

Percentage of coagulum formed (%)

$$= \frac{\text{Weight of coagulum (1) dried completely}}{12.5} \times 100$$

ii. The residual latex after removal of the coagulum (1) was subjected to steam distillation at 180°C under a pressure of 10 Kg/cm². The resulting coagulum was filtered by a 80-mesh stainless-made screen and dried to determine the percentage of the coagulum (2) formed by steam distillation.

Percentage of coagulum formed by distillation (%)

$$= \frac{\text{Weight of coagulum (2) dried completely}}{12.5 - \text{weight of coagulum (1)}} \times 100$$

Table 2 shows polymerization time and the stabilization of the latex, in comparison with that using a commercial disproportionated rosin emulsifying agent and a commercial beef tallow emulsifying agent.

Table 2

|  | polymerization time (hour) | Percentage of coagulum formed (%) | Percentage of coagulum formed by steam distillation (%) |
|---|---|---|---|
| Example |  |  |  |
| 1 | 7.1/6 | 0.28 | 0.88 |
| 2 | 6.½ | 0.27 | 0.94 |
| 3 | 6.½ | 0.12 | 0.26 |
| 4 | 6.½ | 0.15 | 0.47 |
| 5 | 6.¾ | 0.22 | 1.20 |
| 6 | 6.½ | 0.19 | 0.63 |
| 7 | 7.0 | 0.20 | 0.60 |
| 8 | 6.½ | 0.20 | 0.40 |
| 9 | 6.½ | 0.10 | 0.30 |
| 10 | 6.¾ | 0.25 | 0.65 |
| 11 | 6.½ | 0.11 | 0.63 |
| 12 | 6.¾ | 0.15 | 0.50 |
| 13 | 6.¼ | 0.18 | 0.84 |
| 14 | 6.¼ | 0.08 | 0.48 |
| Disproportionated rosin | 6.¼ | 0.25 | 1.85 |
| Beef tallow | 6.0 | 0.02 | 0.21 |

It is evident from the above Table that, with respect to the emulsifying effect for the latex formation, each emulsifying composition of the present invention is slightly inferior to the beef tallow emulsifying agent but superior to the disproportionated rosin emulsifying agent. Thus, the emulsifying composition of the present invention can be used as an emulsifying agent in the emulsion polymerization for production of synthetic rubber in place of disproportionated rosin.

4. Tackiness of produced rubber

Each synthetic rubber (SBR) produced as above was processed at 50°–60°C for 20 minutes to prepare a sheet. The sheet was allowed to stand for 3 hours, and the tackiness was measured by a tackmeter of pick-up-type (contact weight, 500 g; contact time, 10 seconds). The results are shown in Table 3.

Table 3

| Emulsifying agent in Example | Tackiness (g/cm²) |
|---|---|
| 1 | 464 |
| 2 | 460 |
| 3 | 461 |
| 4 | 446 |
| 5 | 452 |
| 6 | 473 |
| 7 | 465 |
| 8 | 447 |
| 9 | 462 |
| 10 | 452 |
| 11 | 465 |
| 12 | 475 |
| 13 | 455 |
| 14 | 484 |
| Disproportionated rosin | 449 |
| Beef tallow | 520 |

It is evident from the above Table that the SBR obtained by using the emulsifying composition of the present invention shows generally a higher tackiness than that obtained by using the disproportionated emulsifying agent and the beef tallow emulsifying agent.

5. Tensile strength of vulcanized SBR

The above obtained SBR was admixed with other materials according to the following prescription, and the resultant composition was processed to make a sheet.

| Prescription and condition | Parts by weight |
|---|---|
| SBR | 100 |
| Zinc oxide | 5 |
| Stearic acid | 1 |
| Sulfur | 2.5 |
| Vulcanization accelerator | 1.2 |
| Carbon black | 50 |
| Roll temperature | 50 ± 5°C |
| Rotation speed of the ahead roll | 12.8 rpm |
| Rotation ratio of the ahead roll to the behind roll | 1 : 1.25 |

The resultant sheet was vulcanized in steam (150°±1°C) for a certain period of time to obtain a vulcanized SBR sheet.

In the same manner as above, SBR produced by the use of disproportionated rosin or beef tallow as an emulsifying agent was processed and subjected to vulcanization to obtain a vulcanized sheet.

The tensile strength (Kg/cm$^2$) of the vulcanized sheets thus obtained is shown in Table 4.

Table 4

| Vulcanization time (min) Emulsifying agent obtained in Example | 15 | 30 | 45 | 60 |
|---|---|---|---|---|
| 1 | 296 | 345 | 358 | 348 |
| 2 | 261 | 339 | 332 | 328 |
| 3 | 258 | 324 | 326 | 330 |
| 4 | 277 | 351 | 345 | 327 |
| 5 | 275 | 340 | 341 | 319 |
| 6 | 286 | 335 | 340 | 326 |
| 7 | 295 | 346 | 344 | 323 |
| 8 | 291 | 334 | 340 | 310 |
| 9 | 260 | 328 | 345 | 337 |
| 10 | 298 | 351 | 352 | 318 |
| 11 | 267 | 347 | 350 | 333 |
| 12 | 262 | 342 | 347 | 330 |
| 13 | 252 | 329 | 354 | 349 |
| 14 | 258 | 336 | 346 | 336 |
| Disproportionated rosin | 271 | 332 | 347 | 323 |
| Beef tallow | 215 | 305 | 311 | 302 |

It is evident from the above Table that the tensile strength of the vulcanized SBR prepared by the use of the emulsifying composition of the invention is generally superior to that of the vulcanized SBR prepared by the use of the disproportionated rosin emulsifying agent or the beef tallow emulsifying agent. It is also evident that the vulcanization of the former proceeds more smoothly than that of the latter.

EXAMPLE 16

Preparation of pine-oil emulsion

1. Twentyfive grams of an emulsifying composition prepared from the resin obtained in Example 1, 9 or 10 (25 % concentration) were mixed with 4 g of pine-oil, 10 g of mineral turpentine and 6 g of anhydrous ethanol to prepare a homogeneous mixture. Thus obtained mixture was then mixed with water to make a pine-oil emulsion.

2. Six grams of the resinous acid obtained in Example 1, 9 or 10 was mixed with 30 g of pine-oil and triethanolamine, and the resultant mixture was stirred to give a homogeneous and transparent solution. Thirty grams of water were slowly added to the transparent solution under stirring to make a homogeneous emulsion. The following pine-oil and water were successively added dropwise to the said emulsion under stirring to prepare a stable white emulsion which had an oily component of 50 %: Pine-oil, 30 g; Water, 30 g; Pine-oil, 31 g; Water, 40 g.

EXAMPLE 17

One hundred grams of a mixture of TCPD(I) monocarboxylic acid and TCPD(II) monocarboxylic acid which were obtained in Example 1(2) and 13 g of glycerin were heated at 220°–240°C for 5 hours to give a mixture of the corresponding ester (abbreviated as "tirglyceride" hereinafter) having a softening point of 89°C and an acid value of 7. Thus obtained triglyceride was blended with natural rubber having a Mooney viscosity (ML-4) of 45 in a proportion of 6 : 4 or 5 : 5 and dissolved in toluene to make a 30 % concentration. The solution was coated on a cellophane tape by an applicater and dried to form an adhesive layer of 40 $\mu$ thick. In the similar manner, a triglyceride of rosin (softening point, 82°C; acid value, 9) and a petroleum resin (Trade mark: "Piccopale 100", Pennsylvania Ind. Chem. Co. in U.S.A.; softening point, 97°C; acid value, 0) were respectively blended with rubber, and adhesive layers were formed on a cellophane tapes. Thus formed adhesive tape was examined as follows:

1. Tackiness by rolling ball method

Tackiness was examined with the aid of an apparatus of PSTC-18. A stainless steel made ball (15 mm diameter) was rolled down from an inclined plate which had an angle of 30° to a horizontal adhesive tape starting at the position of 10 cm height on the said plate to measure a horizontal rolling distance of the ball on the adhesive tape.

2. Adhesion

The said adhesive tape of 15 mm wide was affixed on a clean glass plate with twice compression by rolling a 1-Kg roller. After 12 hours, U peel strength was measured by a TENSILON-tensile strength tester (Toyo Sokki Co. Ltd.) at a peeling rate of 1000 mm/min.

3. Cohesion

Two sheets of the said adhesive tape was affixed each other for 15 mm × 5 mm with twice compression by rolling a 1-Kg roller. After 12 hours, shearing stress was measured by the said tensile strength tester at a peeling rate of 5 mm/min.

The results are shown in Table 5.

Table 5

| Material admixed | Mixing ratio to rubber | Tackiness (cm) | Adhesion (g/15mm wide) | Cohesion g/15mm·5 mm² |
|---|---|---|---|---|
| Resin obtained in Example 1 | 6/4 | 3.7 | 920 | 710 |
|  | 5/5 | 3.0 | 1500 | 800 |
| Rosin ester | 6/4 | 4.1 | 870 | 640 |
|  | 5/5 | 3.4 | 1500 | 560 |
| Piccopale | 6/4 | 16.3 | 1010 | 1000 |
|  | 5/5 | 19.5 | 1500 | cohesive distraction |

From the above Table, it is understood that the most important characteristics required for a pressure sensitive adhesive such as tackiness, adhesion and cohesion are balanced in the one using the resin of this invention and also superior to those of the one using rosin ester.

What is claimed is:

1. A resinous condensed cyclic alkane or alkene carboxylic acid derivative of the general formula:

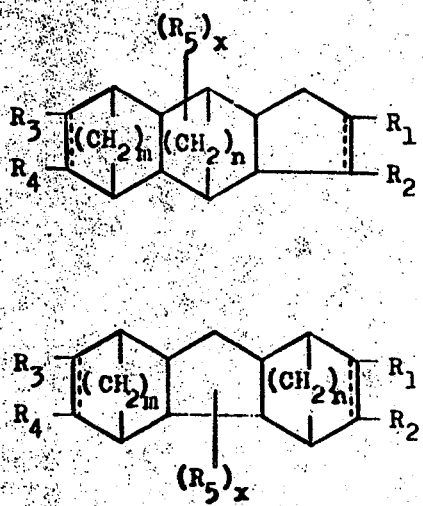

wherein $R_1$, $R_2$, $R_3$ and $R_4$ are each carboxyl, alkoxycarbonyl or hydrogen but one or two of $R_1$ to $R_4$ are always carboxyl or alkoxycarbonyl of which the alkoxy moiety has 1 to 6 carbon atoms and, when more than one carboxyl or alkoxycarbonyl is present, they can not be present at the adjacent positions; $R_5$ is alkyl having 1 to 6 carbon atoms which may be present at any position from the 1- to 9a-positions; $m$ and $n$ are each an integer of 0 or 1 but at least one of them is 1; $x$ is an integer of 0 to 3; and not more than one double bond may be present between the positions indicated by a dotted line and, when present, carboxyl or alkoxycarbonyl can not exist at such positions.

2. A resinous condensed cyclic alkane or alkene carboxylic acid derivative of the general formula:

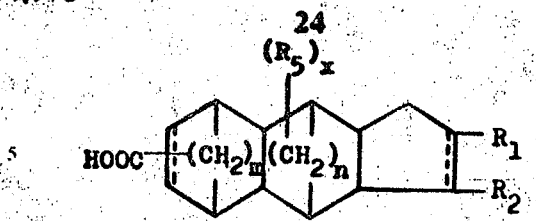

wherein $R_1$ and $R_2$ are each hydrogen; $R_5$ is alkyl having 1 to 6 carbon atoms which may be present at any position from the 1- to 9a-positions; $m$ and $n$ are each an integer of 0 or 1 but at least one of them is 1; $x$ is an integer of 0 to 3; and not more than one double bond may be present between the positions indicated by a dotted line.

3. The resinous condensed cyclic alkane carboxylic acid derivative claimed in claim 2, in which $m$ and $n$ are each 1; $x$ is 0; and any double bond is not present between the positions indicated by a dotted line.

4. The resinous condensed cyclic alkene carboxylic acid derivative claimed in claim 2, in which $m$ and $n$ are each 1; $x$ is 0; and not more than one double bond is present between the positions indicated by a dotted line.

5. A resinous condensed cyclic alkane or alkene carboxylic acid derivative of the general formula:

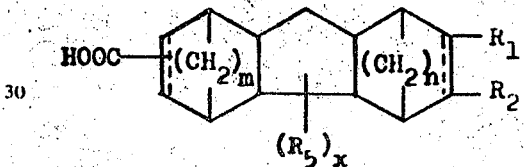

wherein $R_1$ and $R_2$ are each hydrogen; $R_5$ is alkyl having 1 to 6 carbon atoms which may be present at any position from the 1- to 9a-positions; $m$ and $n$ are each an integer of 0 or 1 but at least one of them is 1; $x$ is an integer of 0 to 3; and not more than one double bond may be present between the positions indicated by a dotted line.

6. A resinous condensed cyclic alkane carboxylic acid derivative of the general formula:

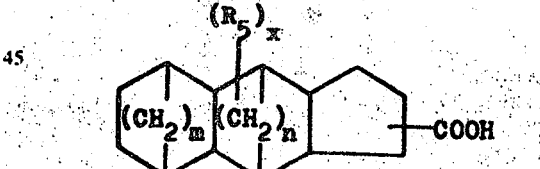

wherein $R_5$ is alkyl having 1 to 6 carbon atoms which may be present at any position from the 1- to 9a-positions; $m$ and $n$ are each an integer of 0 or 1 but at least one of them is 1; and $x$ is an integer of 0 to 3.

7. The resinous condensed cyclic alkane carboxylic acid derivative claimed in claim 6, in which $m$ and $n$ are each 1; and $x$ is 0.

* * * * *